United States Patent
Gottemoller et al.

(10) Patent No.: US 10,068,290 B2
(45) Date of Patent: Sep. 4, 2018

(54) SYSTEM AND METHOD FOR DETERMINING A STABLE QUOTING QUANTITY FOR USE IN A TRADING STRATEGY

(71) Applicant: Trading Technologies International, Inc., Chicago, IL (US)

(72) Inventors: Andrew Gottemoller, Chicago, IL (US); Patricia A. Messina, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 806 days.

(21) Appl. No.: 13/664,164

(22) Filed: Oct. 30, 2012

(65) Prior Publication Data

US 2014/0122314 A1    May 1, 2014

(51) Int. Cl.
*G06Q 40/04*    (2012.01)

(52) U.S. Cl.
CPC ............................ *G06Q 40/04* (2013.01)

(58) Field of Classification Search
CPC ..................................................... G06Q 40/04
USPC ................................. 705/35–45; 750/35–45
See application file for complete search history.

(56) References Cited

U.S. PATENT DOCUMENTS

| | | | |
|---|---|---|---|
| 7,181,424 B1* | 2/2007 | Ketchum | G06Q 30/0627 705/35 |
| 7,729,978 B2 | 6/2010 | Mintz et al. | |
| 8,412,621 B2* | 4/2013 | Madhavan | G06Q 10/04 705/37 |
| 2003/0064104 A1* | 4/2003 | Stillman | A23L 2/38 424/490 |
| 2004/0210511 A1* | 10/2004 | Waelbroeck | G06Q 40/04 705/37 |
| 2007/0118453 A1* | 5/2007 | Bauerschmidt et al. | 705/36 R |
| 2009/0144187 A1* | 6/2009 | Borkovec | G06Q 40/04 705/37 |
| 2011/0093379 A1* | 4/2011 | Lane et al. | 705/37 |
| 2011/0099124 A1 | 4/2011 | Brianti et al. | |
| 2013/0080308 A1 | 3/2013 | Messina et al. | |
| 2013/0246253 A1* | 9/2013 | Waelbroeck et al. | 705/38 |

OTHER PUBLICATIONS

Unpublished U.S. Appl. No. 13/245,406, entitled "Dynamic Leaning Tools," filed Sep. 26, 2011 in the name of Patricia A. Messina et al.

* cited by examiner

*Primary Examiner* — Bruce I Ebersman
(74) *Attorney, Agent, or Firm* — McDonnell Boehnen Hulbert & Berghoff LLP

(57) ABSTRACT

Identification of a stable quoting quantity is disclosed. An example method includes setting a quoting quantity for a trading strategy based on a distribution associated with a tradable object of the trading strategy; defining a range having first and second boundaries based on the distribution; updating a first tracked value according to changes in the distribution; and changing the quoting quantity in response to the first tracked value falling outside the range.

6 Claims, 9 Drawing Sheets

SYSTEM AND METHOD FOR DETERMINING A STABLE QUOTING QUANTITY FOR USE IN A TRADING STRATEGY

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

In addition to trading single items, a user may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

BRIEF DESCRIPTION OF THE FIGURES

Certain embodiments are disclosed with reference to the following drawings.

Figure 1:
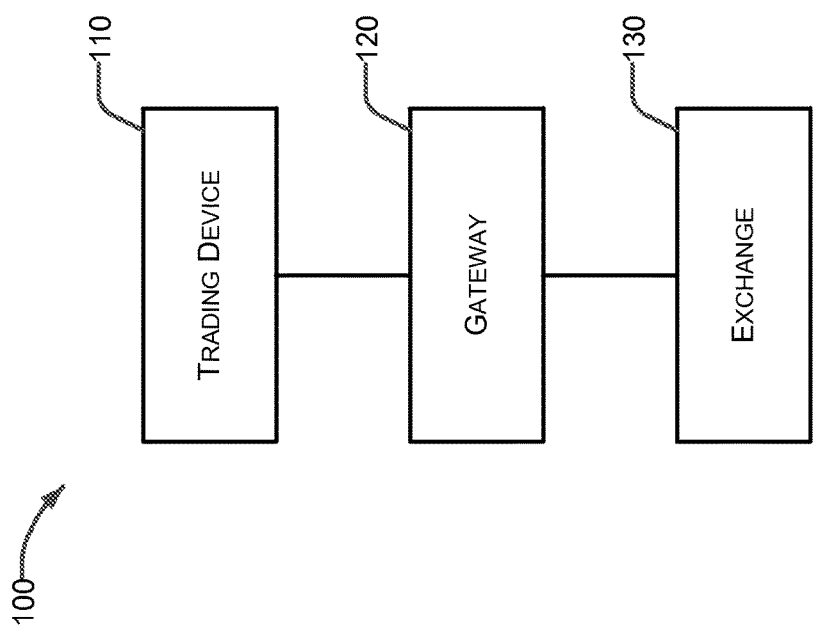
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments relate to trading strategies and, more particularly, to quoting quantities for trading strategies.

Certain dynamic trading tools enable an adjustment of one or more quantities associated with, for example, a spread. When a spread includes a quoting leg having a quoting quantity and a lean or hedge leg having a leaned-on quantity, the dynamic trading tools provide the ability to change the quantity of the quoting leg in response to changes in, for example, an available quantity of the leaned-on tradable object. However, such changes often cause a corresponding user to incur fees and/or are subject to restrictions put in place by an exchange. For example, an exchange may require a user to receive at least one fill for every twenty quoting orders placed (or changes made those orders) or be subject to having orders rejected or assessed a fee. Therefore, in some instances, frequent changes to a quoting quantity of a spread leads to excessive fees and/or other types of undesirable outcomes.

Embodiments disclosed herein reduce a number of times a quoting quantity is changed in connection with, for example, a dynamically adjusted spread. In particular, embodiments disclosed herein monitor an available amount of a leaned-on tradable object to identify a stable quoting quantity. The stable quoting quantity to be identified by the embodiments disclosed herein refers to a quoting quantity that is unlikely to result in an insufficient amount of the leaned-on tradable object being available when the quoting leg is filled. As described in greater detail below, embodiments disclosed herein generate a distribution (for example, a standard deviation from a mean over a plurality of measurements or a period of time) associated with an available amount of the leaned-on tradable object for use in identifying the stable quoting quantity. The embodiments disclosed herein utilize the distribution to set an initial stable quoting quantity for a spread. Further, the embodiments disclosed herein utilize the distribution to define a range and to maintain a plurality of tracked values. The tracked values of the embodiments disclosed herein are updated according to changes in the distribution over time.

According to the embodiments disclosed herein, when one of the tracked values falls outside the defined range, the stable quoting quantity is updated. According to the embodiments disclosed herein, when the tracked values are within the defined range, the stable quoting quantity is maintained at its current value. In other words, according to embodiments disclosed herein, the stable quoting quantity may not be updated or changed despite some change in the available quantity of the leaned-on tradable object. Thus, through use of the embodiments disclosed herein, the quoting quantity of the spread is only dynamically updated when significant change (for example, a significant change in the mean available amount and/or a significant change in the standard deviation from the mean available amount) occurs in connection with the leaned-on tradable object.

By identifying the stable quoting quantity for a spread, the embodiments disclosed herein enable the spread to lean on a reliable amount of the leaned-on tradable object. Further, the embodiments disclosed herein reduce the frequency of dynamic updates to the quoting quantity of the spread.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including setting a quoting quantity for a trading strategy based on a distribution associated with a tradable object of the trading strategy; defining a range having first and second boundaries based on the distribution; updating a first tracked value according to changes in the distribution; and changing the quoting quantity in response to the first tracked value falling outside the range.

Certain embodiments provide a tangible machine readable storage medium comprising instructions that, when executed, cause a machine to set a quoting quantity for a trading strategy based on a distribution associated with a tradable object of the trading strategy; define a range having first and second boundaries based on the distribution; update a first tracked value according to changes in the distribution; and change the quoting quantity in response to the first tracked value falling outside the range.

Certain embodiments provide an apparatus including a memory storing machine readable instructions and a processor which, upon executing the instructions performs operations including determining a distribution associated with a tradable object of a trading strategy; defining a range having first and second boundaries each based on the distribution; initiating a quoting quantity to a value equal to the first boundary; updating first and second tracked values based on changes in the distribution; if the first tracked value is updated to be less than the first boundary, changing the quoting quantity; and if the second tracked value is updated to be greater than the second boundary, changing the quoting quantity.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradable objects to the exchange 130.

Market data may include data about a market for a tradable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradable object is anything which may be traded. For example, a certain quantity of the tradable object may be bought or sold for a particular price. A tradable object may include, for example, financial products, stocks, options, bonds, future contracts, currency, warrants, funds derivatives, securities, commodities, swaps, interest rate products, index-based products, traded events, goods, or a combination thereof. A tradable object may include a product listed and/or administered by an exchange (for example, the exchange 130), a product defined by the user, a combination of real or synthetic products, or a combination thereof. There may be a synthetic tradable object that corresponds and/or is similar to a real tradable object.

An order message is a message that includes a trade order. A trade order may be, for example, a command to place an order to buy or sell a tradable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradable objects, for example, offered for trading by the exchange, to be bought and sold. The exchange 130 may include separate entities, some of which list and/or administer tradable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
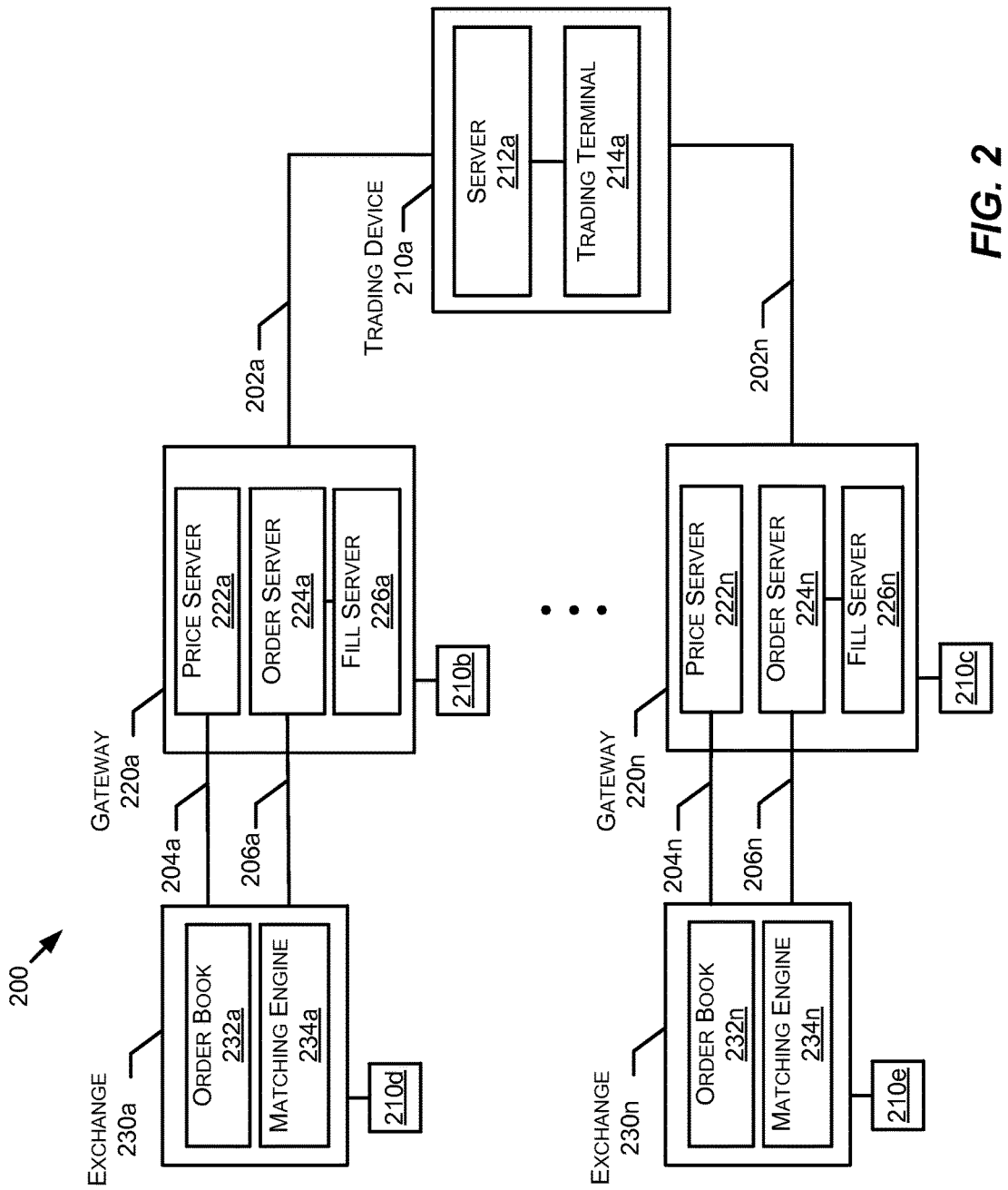
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
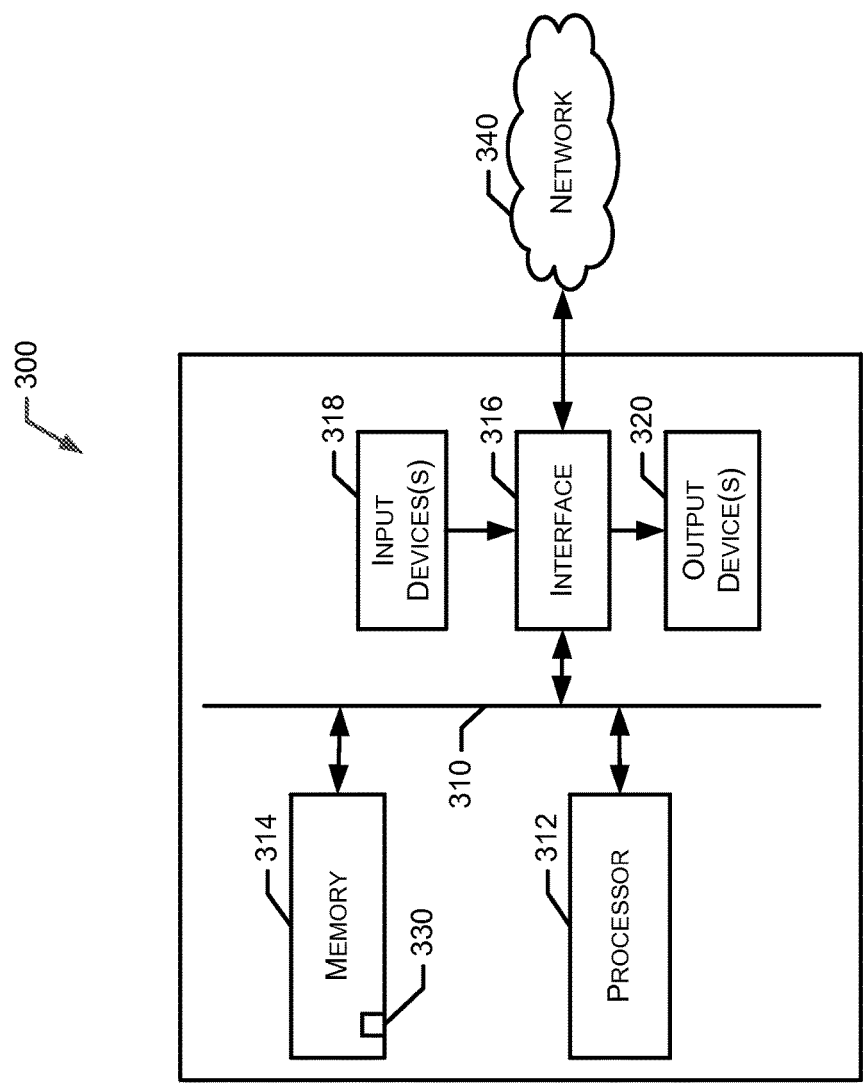
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

[The following section is for inclusion in cases that deal with strategy trading and should be removed (along with the corresponding FIG. 4) if not applicable.]

V. Strategy Trading

In addition to buying and/or selling a single tradable object, a user may trade more than one tradable object according to a trading strategy. One common trading strategy is a spread and trading according to a trading strategy may also be referred to as spread trading. Spread trading may attempt to capitalize on changes or movements in the relationships between the tradable object in the trading strategy, for example.

An automated trading tool may be utilized to trade according to a trading strategy, for example. For example, the automated trading tool may AUTOSPREADER®, provided by Trading Technologies.

A trading strategy defines a relationship between two or more tradable objects to be traded. Each tradable object being traded as part of a trading strategy may be referred to as a leg or outright market of the trading strategy.

When the trading strategy is to be bought, the definition for the trading strategy specifies which tradable object corresponding to each leg should be bought or sold. Similarly, when the trading strategy is to be sold, the definition specifies which tradable objects corresponding to each leg should be bought or sold. For example, a trading strategy may be defined such that buying the trading strategy involves buying one unit of a first tradable object for leg A and selling one unit of a second tradable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradable object for leg A and selling 3 units of a second tradable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
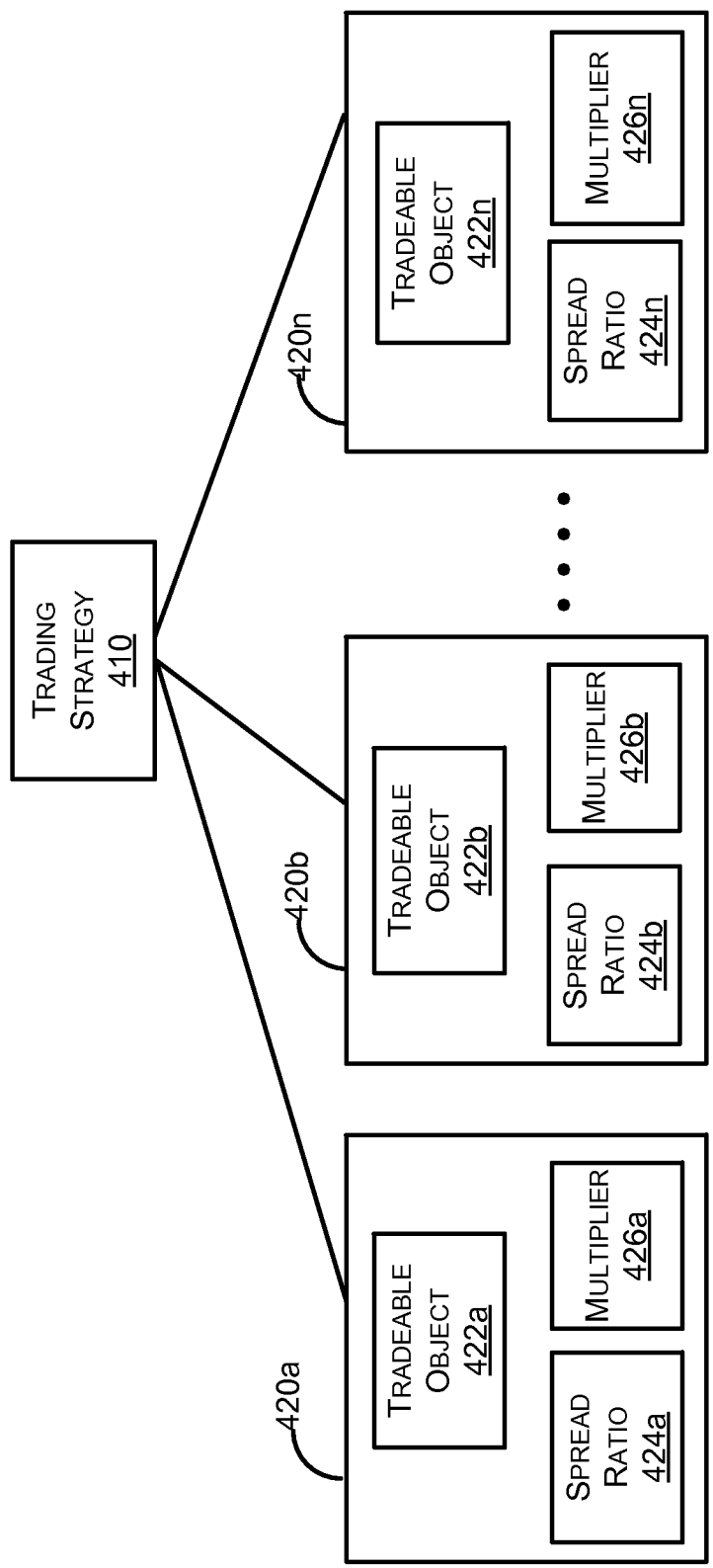
FIG. 4 illustrates a block diagram of a trading strategy which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradable objects 422 (individually identified as tradable object 422a to tradable object 422n) of each of the legs 420a to 420n using the corresponding spread ratios 424a to 424n and multipliers 426a to 426n.

Once defined, the tradable objects 422 in the trading strategy 410 may then be traded together according to the defined relationship. For example, assume that the trading strategy 410 is a spread with two legs, leg 420a and leg 420b. Leg 420a is for tradable object 422a and leg 420b is for tradable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradable object 422a is bought (positive spread ratio, same direction as the spread) and 1 unit of tradable object 422b is sold (negative spread ratio, opposite direction of the spread). As mentioned above, typically in spread trading the opposite of the definition applies. That is, when the definition for the spread is such that when the spread is sold, 1 unit of tradable object 422a is sold (positive spread ratio, same direction as the spread) and 1 unit of tradable object 422b is bought (negative spread ratio, opposite direction of the spread).

The price for the trading strategy 410 is determined based on the definition. In particular, the price for the trading strategy 410 is typically the sum of price the legs 420 comprising the tradable objects 422 multiplied by corresponding multipliers 426. The price for a trading strategy may be affected by price tick rounding and/or pay-up ticks. However, both of these implementation details are beyond the scope of this discussion and are well-known in the art.

As discussed above, a real spread may be listed at an exchange, such as exchange 130 and/or 230, as a tradable product. In contrast, a synthetic spread may not be listed as a product at an exchange, but rather the various legs of the spread are tradable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradable object 422a typically has a price 10 greater than tradable object 422b, then it may be advantageous to buy the spread whenever the difference in price between tradable objects 422a and 422b is less than 10 and sell the spread whenever the difference is greater than 10. As an example, assume that tradable object 422a is at a price of 45 and tradable object 422b is at a price of 40. The current spread price may then be determined to be (1)(45)+(−1)(40) =5, which is less than the typical spread of 10. Thus, a user may buy 1 unit of the spread, which results in buying 1 unit of tradable object 422a at a price of 45 and selling 1 unit of tradable object 422b at 40. At some later time, the typical price difference may be restored and the price of tradable object 422a is 42 and the price of tradable object 422b is 32. At this point, the price of the spread is now 10. If the user sells 1 unit of the spread to close out the user's position (that is, sells 1 unit of tradable object 422a and buys 1 unit of tradable object 422b), the user has made a profit on the total transaction. In particular, while the user bought tradable object 422a at a price of 45 and sold at 42, losing 3, the user sold tradable object 422b at a price of 40 and bought at 32, for a profit of 8. Thus, the user made 5 on the buying and selling of the spread.

The above example assumes that there is sufficient liquidity and stability that the tradable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned-on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned-on price changes, the price for the order in the quoting leg may also change to maintain the desired strategy price.

The leaned-on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned-on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. Dynamic Leaning

Dynamic leaning involves adjusting quantity in a quoting leg based on an available leaned-on quantity. For example, the quantity in the quoting leg may be reduced when the available leaned-on quantity decreases. Some dynamic leaning mechanisms and techniques are discussed in U.S. Pat. No. 7,729,978, filed on Mar. 28, 2007, and U.S. patent application Ser. No. 13/245,406, filed Sep. 26, 2011. The contents of U.S. Pat. No. 7,729,978 and the contents of U.S. patent application Ser. No. 13/245,406 are fully incorporated herein by reference.

In some previous implementations of dynamic leaning, the quoting quantities are adjusted each time a change occurs in the corresponding available leaned-on quantity, regardless of a magnitude of the change in the available leaned-on quantity. Such previous implementations have the potential of adjusting the quoting quantities a significant number of times. In many exchanges, adjustment of the quoting quantity incurs a fee or penalty. Alternatively, some exchanges require a certain amount of quoting quantity to be filled. Thus, in some instances, a large number of quoting quantity adjustments may be undesirable.

VII. Stable Quoting Quantity Identification

Figure 5A:
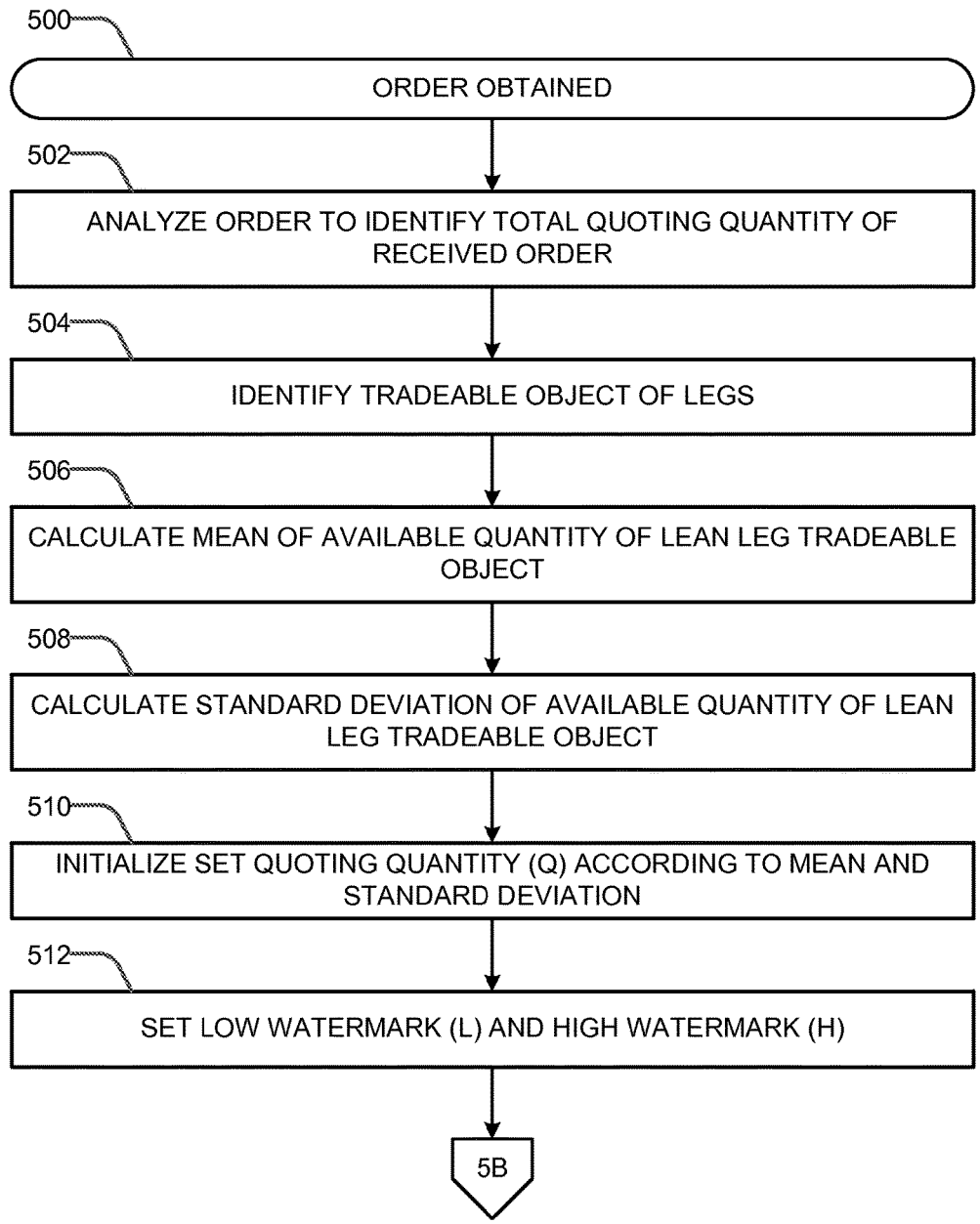
FIGS. 5A and 5B are flowcharts representative of example machine readable instructions that may be executed to implement examples disclosed herein.
Figure 5B:
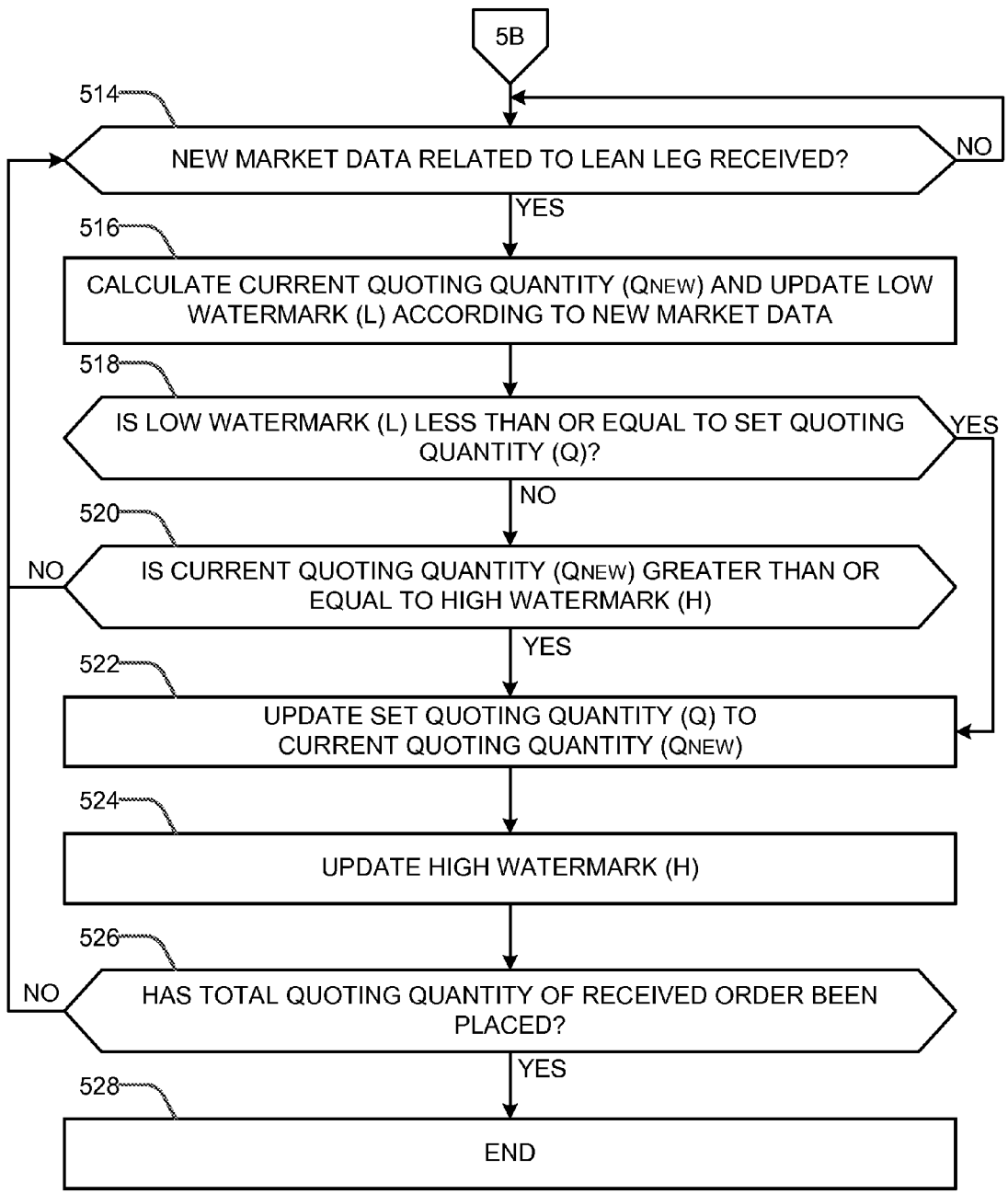

FIGS. 5A and 5B are flowcharts representative of example operations that can be executed to implement the teachings of this disclosure. The example operations of FIGS. 5A and 5B can be implemented by, for example, the example trading device 110 of FIG. 1 and/or the example trading device 210 of FIG. 2. While the example trading device 110 of FIG. 1 is described as executing the example operations of FIGS. 5A and 5B below, any suitable device can execute the example operations of FIGS. 5A and 5B. The example operations of FIGS. 5A and 5B reduce an amount of times a quoting quantity of a spread is adjusted in response to changes in an available quantity of a leaned-on tradable object. To achieve this processing efficiency, the example operations of FIGS. 5A and 5B include identifying a stable quoting quantity based on a mean quantity of the leaned-on tradable object and a distribution of the quantity around the mean. Further, the example operations of FIGS. 5A and 5B include defining first and second (for example, low and high, upper and lower, etc.) configurable watermarks based on the identified stable quoting quantity. The established watermarks define a range representing the amount or volume of available quantity in the leaned-on tradable object that warrant an adjustment of the stable quoting quantity. When either of the established watermarks is met or exceeded, the stable quoting quantity is adjusted according to the example operations of FIGS. 5A and 5B. As a result, the example operations of FIGS. 5A and 5B limit dynamic changes to the quoting quantity to instances in which the available quantity of the leaned-on tradable object has changed beyond a threshold amount.

The example of FIG. 5A begins with the trading device 100 obtaining a trading strategy (block 500). For example, the obtained trading strategy may have been placed by a user and/or generated by an automated trading tool. The order is analyzed to identify a total quoting quantity of the order (block 502). In particular, a total quoting quantity of a quoting leg of the order is identified. In other words, the example trading device 110 determines how many units of a tradable object of the quoting leg are to be bought or sold according to the obtained order. Additional or alternative aspects of the spread are also determined such as, for example, whether the spread includes a ratio and/or a multiplier to further define the trading strategy. In some instances, the example trading device 110 executing the example operations of FIGS. 5A and 5B may determine that the stable quoting quantity is less than the total quoting quantity of the order. Accordingly, only a portion of the total quoting quantity of the order may be placed at a given time. Thus, the example trading device 110 can use the calculated total quoting quantity to, for example, determine when the entire quoting leg of the obtained order has been filled.

The tradable objects of a lean leg and the corresponding quoting leg of the order are identified (block 504). In some examples, the example trading device 110 may also determine exchange information associated with the order such as, for example, at which exchange the quoting and/or lean legs are to be executed.

The example trading device 100 calculates a mean available quantity of the leaned-on tradable object over a period of time or over a number of measurements (block 506). The period of time over which the mean is calculated can be adjusted by, for example, a user or an automated trading device. The example trading device 110 takes a plurality of measurements of a market depth (e.g., available quantity) of the leaned-on tradable object and averages the measured depths to generate the mean ($\mu$). In the illustrated example, the mean ($\mu$) is calculated using the following equation:

$$\mu = \frac{\sum_{i=0}^{n} T_i V_i}{\sum_{i=0}^{n} T_i},$$ Equation 1 where $V_i$ is the measured volume for depth measurement i, and $T_i$ is the duration of $V_i$ until $V_{i+1}$.

The example trading device 110 also generates a distribution including the calculated mean (μ) of the available quantity of the leaned-on tradable object over a specified period of time (block 508). In the illustrated example of FIG. 5A, the example trading device 110 generates a standard normal or Gaussian distribution as a function of a standard deviation (σ) from the calculated mean (μ). However, any other suitable distribution or type of distribution can be utilized. In the illustrated example, the standard deviation (σ) is calculated using the following equation:

$$\sigma = \sqrt{\frac{\sum_{i=0}^{n} T_i(V_i - \mu)2}{\sum_{i=0}^{n} T_i}} \qquad \text{Equation 2}$$

Figure 6:
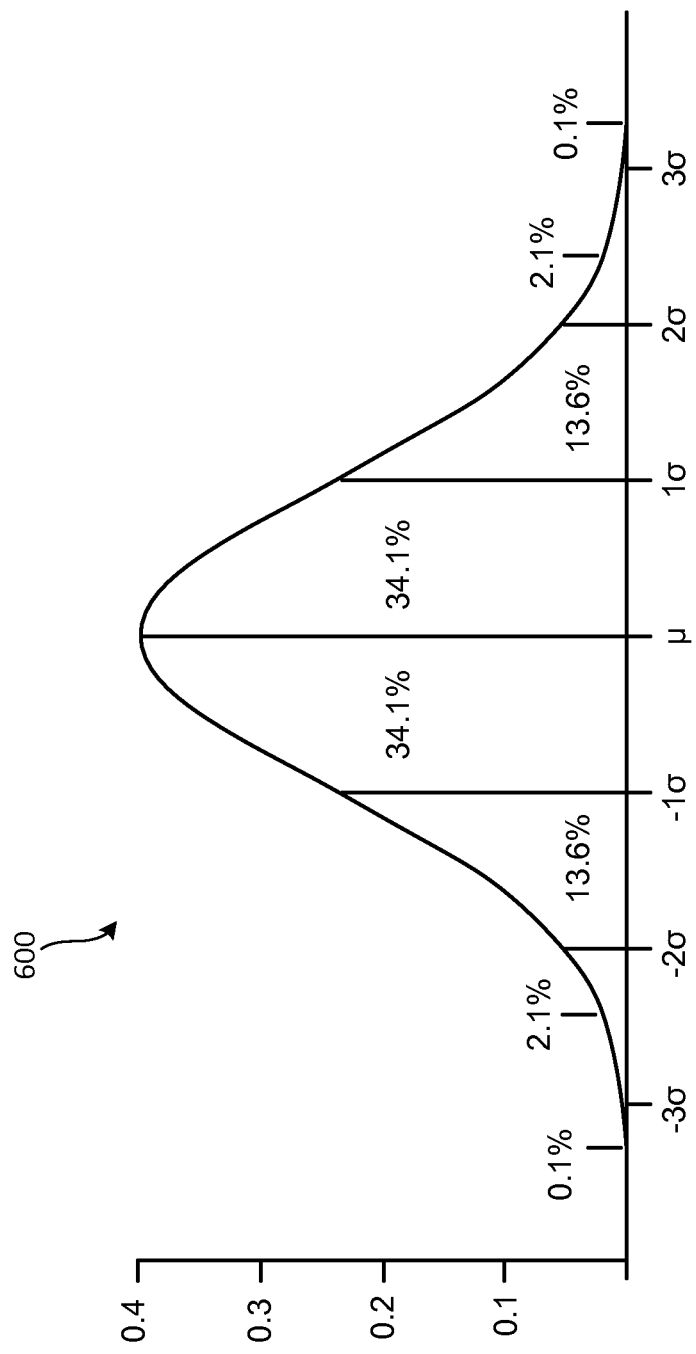
FIG. 6 is an example distribution calculated in connection with the example instructions of FIGS. 5A and 5B.

FIG. 6 illustrates an example distribution 600 generated in connection with the example operations of FIGS. 5A and 5B. The example distribution 600 of FIG. 6 is representative of a standard normal distribution or bell curve where each band or region has a width of one (1) standard deviation centered on the calculated mean (μ). The example distribution 600 of FIG. 6 is indicative of how the available quantity of the leaned-on tradable object has varied over a recent period of time. As the mean (μ) and the standard deviation (σ) are continuously calculated and generated over time based on the market depth of the leaned-on tradable object, the example distribution 600 of FIG. 6 can shift (for example, from left to right or right to left) and/or change shape in accordance with changes in the available quantity of the leaned-on tradable object. When more market depth measurements deviate farther from the mean (μ), the example distribution 600 becomes wider and flatter. When more market depth measurements deviate closer to the mean (μ), the example distribution 600 becomes taller and thinner. The period of time over which the mean (μ) and the standard deviation (σ) are calculated is configurable by, for example, a user and/or the trading device 110 acting on behalf of the user. For example, the mean (μ) and the standard deviation (σ) can be calculated for the previous twenty (20) minutes, two (2) months, two (2) years, etc. In some examples, the mean (μ) and the standard deviation (σ) are calculated for a previous period of time that does not immediately preceded a current time. That is, the mean (μ) and the standard deviation (σ) may be calculated for any suitable set or subset of historical data for any suitable period of time.

According to the example operations of FIGS. 5A and 5B, a plurality of values are generated based on the mean (μ) and the standard deviation (σ) to establish a stable quoting quantity, to define a range of acceptable changes to the market depth of the leaned tradable object, and to determine when the stable quoting quantity should be updated. In the illustrated example, a configurable stability multiplier, a low multiplier, and a high multiplier are utilized to set the plurality of values. In particular, a set quoting quantity (Q) is set (block 510). In the illustrated example, the set quoting quantity (Q) corresponds to the stable quoting quantity to be utilized by the trading strategy. In the illustrated example, the set quoting quantity (Q) is calculated using the following equation:

$$Q = \mu - m\sigma, \qquad \text{Equation 3:}$$

where the stability multiplier is represented by (m). The stability multiplier is a configurable multiplier set by, for example, a user and/or a trading device operating on behalf of the user. In some examples, the stability multiplier may be set between a value of two (2) and three (3). When the stability multiplier increases, the stability of the spread (i.e., a likelihood of the spread being filled and not legged) increases because the stable quoting quantity (Q) corresponding to a calculated available quantity of the leaned-on tradable object decreases. In other words, a lower stable quoting quantity is relatively more likely to be filled as a lower quantity of the leaned-on tradable object needs to be available. Further an increased stability multiplier causes less frequent updates to the set quoting quantity (Q). Thus, the stability multiplier represents and can be adjusted according to an amount of risk that a user is willing to take regarding the stability of the spread. The stability multiplier may correlate to a likelihood and/or a range of likelihoods that the spread is stable and will be filled. For example, a value of in a range of two (2) to three (3) for the stability multiplier may correspond to an approximately ninety-five percent (95%) likelihood that the spread is stable. In some examples, the stability multiplier may be assigned a negative value, which represents a higher degree of risk that the spread will be legged. For example, a value of negative two (−2) for the stability multiplier may correspond to an approximately five percent (5%) likelihood that the spread is stable.

The example operations of FIGS. 5A and 5B also establish a value referred to herein as a low watermark (L) (block 512). The low watermark (L) is continuously updated as each market depth measurement is obtained. In other words, when a change occurs in the available quantity of the leaned-on tradable object, the example low watermark (L) is updated. The low watermark (L) is used to determine when the market depth of the leaned-on tradable object has decreased to a point at which a downwards adjustment of the set quoting quantity (Q) is desired (for example, so that the set quoting quantity (Q) represents a stable quantity that is unlikely to be legged as a result of insufficient quantity in the leaned-on market). The low multiplier, which is configurable by a user and/or a trading device acting on behalf of the user, is used to define a distance from the mean (μ) at which the low watermark (L) is to be set. The example low watermark (L) is established and tracked according to the following equation:

$$L = \mu_{NEW} - l\sigma_{NEW}, \qquad \text{Equation 4:}$$

where the low multiplier is represented by (l). In the illustrated example, the low multiplier is less than the stability multiplier.

The example operations of FIGS. 5A and 5B also establish a value referred to herein as a high watermark (H) (block 512). Similar to the set quoting quantity (Q), the high watermark (H) is set and maintained until conditions in the leaned-on market indicate that the set quoting quantity (Q) should be updated. Each time the set quoting quantity (Q) is set or updated, the example high watermark (H) is calculated. The high watermark (H) is used to determine when the market depth of the leaned-on tradable object has been increased to a point at which an upwards adjustment of the set quoting quantity (Q) is desired. The high multiplier, which is configurable by a user and/or a trading device acting on behalf of the user, is used to define a distance from the mean (μ) at which the high watermark (H) is to be set. In the illustrated example, the value of the high watermark (H) is set according to the following equation:

$$H = \mu - h\sigma,$$ Equation 5:

where the high multiplier is represented by (h). In the illustrated example, the high multiplier is less than the stability multiplier.

The example operations of FIGS. 5A and 5B also track a value referred to herein as a current quoting quantity ($Q_{NEW}$). Similar to the low watermark (L), the current quoting quantity ($Q_{NEW}$) is continuously updated as each market depth measurement is obtained. The current quoting quantity ($Q_{NEW}$) represents the value of the quoting quantity according to current conditions of the leaned-on tradable object. While the set quoting quantity (Q) is only updated when certain condition exist or are reached, the current quoting quantity ($Q_{NEW}$) is continuously updated as each market depth measurement is obtained. The set quoting quantity (Q) is updated to ($Q_{NEW}$) when the certain conditions exist or are reached in the leaned market. In the illustrated example, the following equation is used for the current quoting quantity ($Q_{NEW}$):

$$Q_{NEW} = \mu_{NEW} - m\sigma_{NEW}.$$ Equation 6:

Thus, in accordance with the example operations of FIGS. 5A and 5B, the example trading device 110 generates and/or tracks a plurality of values associated with the leaned-on tradable object. While some of the values (the set quoting quantity (Q) and the high watermark (H)) are maintained until certain conditions are detected, other ones of the values (the current quoting quantity ($Q_{NEW}$) and the low watermark (L)) are tracked and continuously updated.

Figure 7:
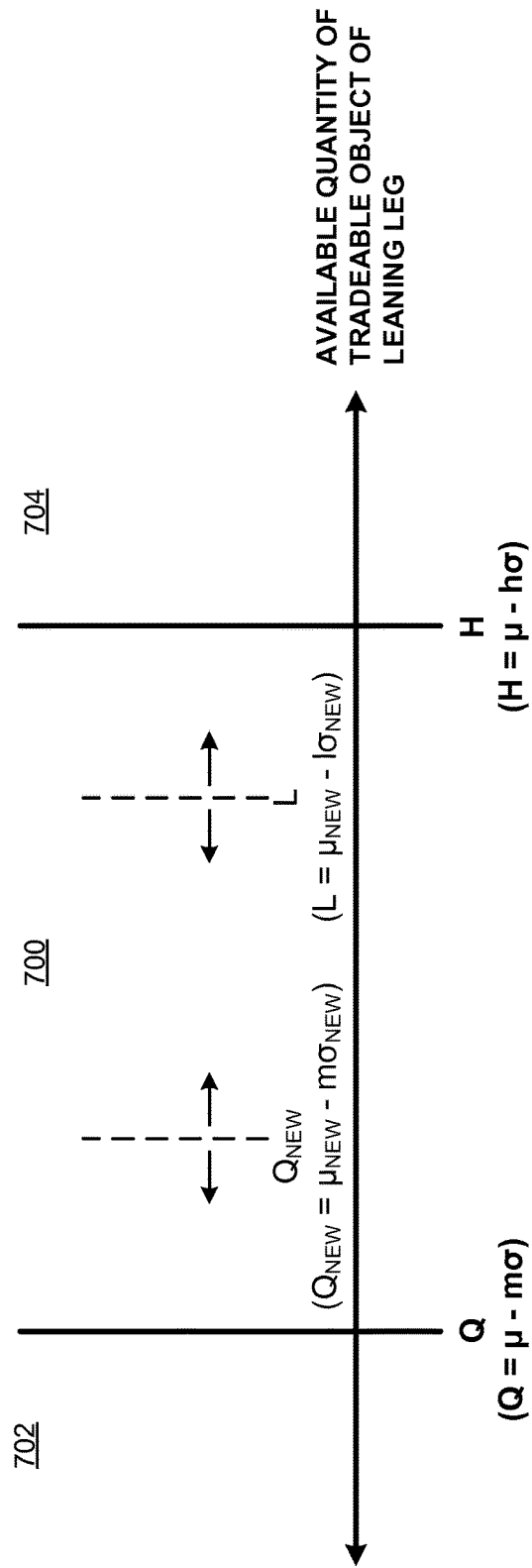
FIG. 7 is a diagram illustrative of an example range managed by the example instructions of FIGS. 5A and 5B.

In operation, the low watermark (L) and the high watermark (H) shown in FIG. 7 illustrate an example configuration of the values utilized by the example operations of FIGS. 5A and 5B. The horizontal axis of FIG. 7 represents the available quantity of the leaned-on tradable object of the received order. The set quoting quantity (Q) and the example high watermark (H) form first and second boundaries, respectively, that define a range. The current quoting quantity ($Q_{NEW}$) and the low watermark (L) move along the horizontal axis in accordance with changes in the available quantity of the leaned-on tradable object. Initially, the current quoting quantity ($Q_{NEW}$) and the low watermark (L) are within the range defined by the set quoting quantity (Q) and the example high watermark (H). The example range defined in FIG. 7 corresponds to an acceptable deviation in the available quantity of the leaned-on tradable object. In other words, a first region 700 within the range defined by the set quoting quantity (Q) and the high watermark (H) corresponds to instances in which the initialized stable quoting quantity is still considered stable. Further, second and third regions 702 and 704 of FIG. 7 that fall outside the range correspond to instances in which the stable quoting quantity should be adjusted to remain stable.

With reference to FIG. 5B, when new market data related to the lean leg of the order is received (block 514), the example trading device 110 calculates the value of the current quoting quantity ($Q_{NEW}$) and updates the low watermark (L) according to the new market data (block 516). When the tracked values ($Q_{NEW}$) and (L) are updated, the value of the set quoting quantity (Q) is compared to the low watermark (L) (block 518). The low watermark (L) becoming less than the set quoting quantity (Q) corresponds to the low watermark (L) falling into the second region 702 of FIG. 7. If the trading device 110 determines that the low watermark (L) has become less than the set quoting quantity (Q), the set quoting quantity (Q) is to be updated. When the tracked values ($Q_{NEW}$) and (L) are updated, the value of the high watermark (H) is compared to the current quoting quantity ($Q_{NEW}$) (block 520). The current quoting quantity ($Q_{NEW}$) becoming greater than the high watermark (H) corresponds to the current quoting quantity ($Q_{NEW}$) falling into the third region 704 of FIG. 7. If the current quoting quantity ($Q_{NEW}$) has become greater than the high watermark (H), the set quoting quantity is to be updated.

In the example of FIG. 5B, the low watermark (L) is less than the set quoting quantity (Q) (block 518), or the current quoting quantity ($Q_{NEW}$) is greater than the high watermark (H) (block 520), the set quoting quantity (Q) is updated to the value of the current quoting quantity ($Q_{NEW}$) (block 522). Further, in conjunction with the update of the set quoting quantity (Q) to the value of the current quoting quantity ($Q_{NEW}$), the example high watermark (H) is set or updated according to the corresponding market depth of the leaned-on tradable object at that time (block 524).

Thus, with reference to FIG. 7, the set quoting quantity (Q) is updated to the value of the current quoting quantity ($Q_{NEW}$) when the current quoting quantity ($Q_{NEW}$) moves into the third region 704. Additionally, the set quoting quantity (Q) is updated to the value of the current quoting quantity ($Q_{NEW}$) when the low watermark (L) moves into the second region 702. Further, the high watermark (H) is updated when the set quoting quantity (Q) is updated to the value of the current quoting quantity ($Q_{NEW}$). Accordingly, each time the set quoting quantity (Q) is updated to reflect a stable quantity, a new range defined by (Q) and (H) is defined.

In some examples, a timer is utilized to define a grace period for the market depth of the leaned-on tradable object to recover before updating the set quoting quantity (Q). That is, in response to determining that the set quoting quantity should be updated (for example, when the current quoting quantity ($Q_{NEW}$) moves into the third region 704 or when the low watermark (L) moves into the second region 702), the example trading device 110 may wait for a defined period of time, determine whether conditions for the update still exist, and perform the update if the update conditions still exist. As such, if one of the tracked values falls outside of the defined acceptable deviation range for only a brief period of time (or for only a few market depth measurements), the set quoting quantity (Q) is not updated for that particular instance.

If the total quoting quantity of the received order (as determined upon receipt of the order) has been placed (block 526), then the operations of FIGS. 5A and 5B end (block 528). Otherwise, the example operations wait for new market data (block 514).

Figure 8:
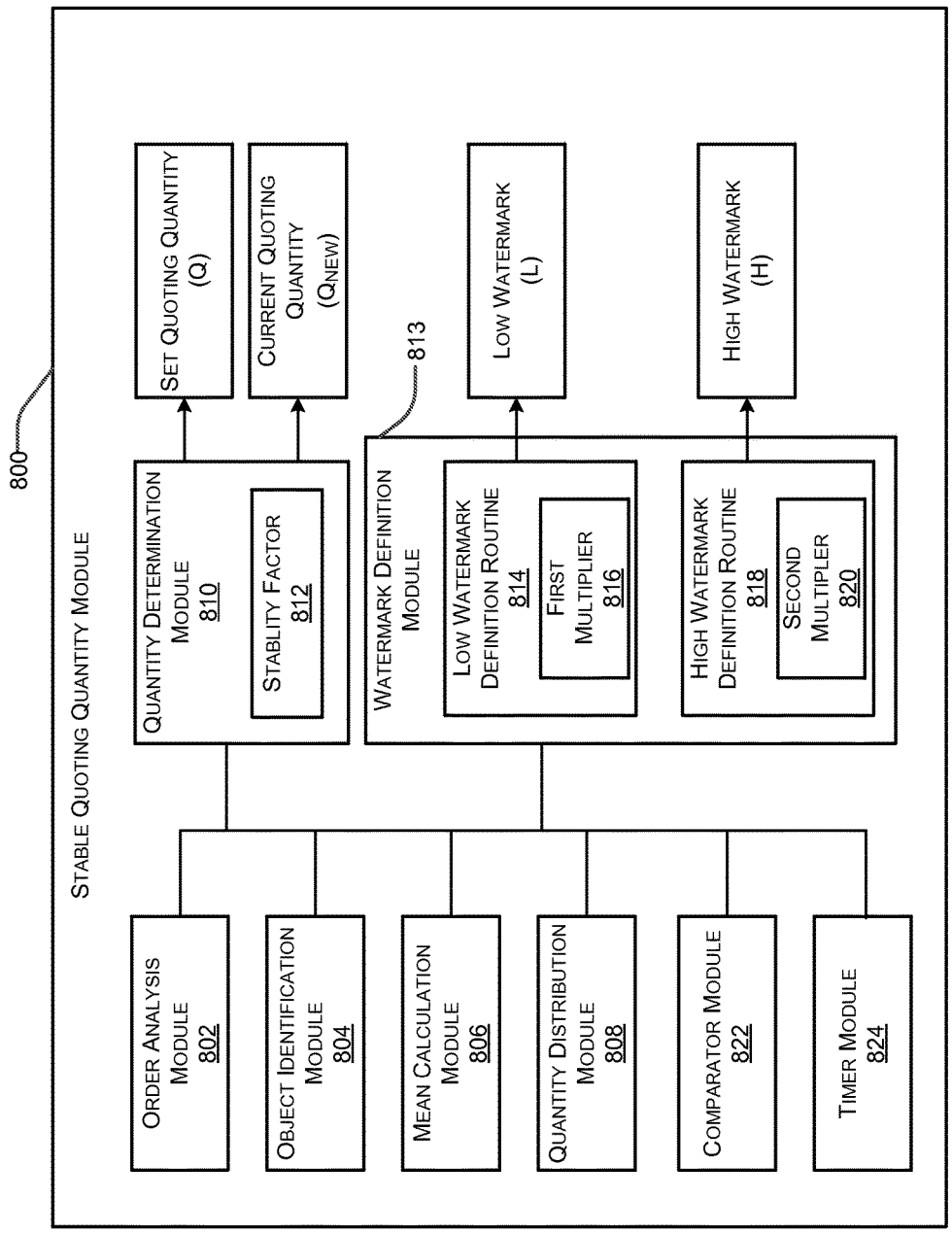
FIG. 8 is a block diagram representative of an example stable quoting quantity identifier to implement the example instructions of FIGS. 5A and 5B.

FIG. 8 is block diagram of an example stable quoting quantity module 800 that may implement and/or execute the example operations of FIGS. 5A and 5B. In some examples, the stable quoting quantity module 800 may be implemented as a part of a trading application associated with the trading device 110 of FIG. 1 and/or the trading device 210 of FIG. 2. In some examples, the stable quoting quantity module 800 may be implemented as computer implemented code or instructions operable independent of a trading application. In some examples, the features and functionality of the stable quoting quantity module 800 may be implemented in hardware operable in connection with the trading device 110 of FIG. 1 and/or the trading device 210 of FIG. 2.

The example stable quoting quantity module 800 of FIG. 8 includes an order analysis module 802 to receive and process a trading strategy, such as a spread, being executed by, for example, the trading device 110 of FIG. 1. The example order analysis module 802 identifies certain quantities associated with the spread. In the illustrated example, the order analysis module 802 identifies a total quoting quantity of a quoting leg of the spread and/or whether a definition of the spread includes a ratio and/or multiplier.

The example stable quoting quantity module 800 of FIG. 8 includes an object identification module 804 to identify the tradable object of a lean leg and/or the quoting leg of the spread. The example stable quoting quantity module 800 of FIG. 8 also includes a mean calculation module 806 to calculate the mean ($\mu$) of the available quantity of the leaned-on tradable object over a period of time and/or over a set of market depth measurements. In the example of FIG. 8, the mean calculation module 806 calculates the mean ($\mu$) according to Equation 1 above. Using the calculated mean ($\mu$) and market depth measurements, a quantity distribution module 808 generates a distribution associated with the leaned-on tradable object. In the example of FIG. 8, the quantity distribution module 808 calculates a standard deviation ($\sigma$) from the mean ($\mu$) using Equation 2 above.

The example stable quoting quantity module 800 of FIG. 8 includes a quantity determination module 810 to establish and maintain the set quoting quantity (Q) according to the configurable stability multiplier 812. Using the calculated standard deviation ($\sigma$), the calculated mean ($\mu$), and the stability multiplier 812, the example quantity determination module 810 establishes or initializes the set quoting quantity (Q) according to Equation 3 above. The example stable quoting quantity module 800 of FIG. 8 also includes a watermark definition module 813 to establish and maintain the low and high watermarks (L) and (H). In the illustrated example, the watermark definition module 813 implements a low watermark definition routine 814, which references a first multiplier 816. The first multiplier 816 of FIG. 8 corresponds to the low multiplier (l) referred to in connection with FIGS. 5A and 5B. The example watermark definition module 813 of FIG. 8 also implements a high watermark definition routine 818, which references a second multiplier 820. The second multiplier 820 of FIG. 8 corresponds to the high multiplier (h) referred to in connection with FIGS. 5A and 5B. In the illustrated example, the low watermark definition routine 814 sets and tracks the low watermark (L) according to Equation 4 above. Further, in the illustrated example, the high watermark definition routine 818 sets the high watermark (H) according to Equation 5 above.

When new market data related to the leaned-on tradable object (for example, a new amount of available quantity) is detected and/or received, the example quantity determination module 810 calculates and/or updates the current quoting quantity ($Q_{NEW}$) and the example low watermark definition routine 814 updates the low watermark (L). The new market data may correspond to a shift in the mean ($\mu$) and/or a change in the standard deviation ($\sigma$) associated with the leaned-on tradable object. Such changes may correspond to a change in the quoting quantity that is considered to be stable (for example, unlikely to result in the spread being legged).

When the tracked values ($Q_{NEW}$) and (L) have been calculated and/or updated, an example comparator module 822 determines whether the low watermark (L) is less than or equal to the set quoting quantity (Q). That is, with reference to FIG. 7, the comparator 822 determines whether the low watermark (L) has fallen outside of the range and into the second region 702. If not, the example comparator 822 determines whether the current quoting quantity ($Q_{NEW}$) is greater than or equal to the high watermark (H). That is, with reference to FIG. 7, the comparator 822 determines whether the current quoting quantity ($Q_{NE}$) has fallen outside of the range and into the third region 704. If not, the example stable quoting quantity module 800 waits for new market data.

On the other hand, if the example comparator 822 determines that the low watermark (L) is less than or equal to the set quoting quantity (Q) or that the current quoting quantity ($Q_{NEW}$) is greater than or equal to the high watermark (H), the example stable quoting quantity module 800 determines that the set quoting quantity (Q) should be updated. In particular, the example quantity determination module 810 updates the set quoting quantity (Q) to equal the current quoting quantity ($Q_{NEW}$). Further, the example high watermark definition routine 818 updates the high watermark (H) according to current conditions (the mean ($\mu$) and standard deviation ($\sigma$)) of the available quantity of the leaned-on tradable object.

The example stable quoting quantity module 800 also utilizes a timer module 824 to define a grace period for the market depth of the leaned on tradable object to recover before updating the set quoting quantity (Q). That is, in response to determining that the set quoting quantity should be updated (for example, when the current quoting quantity ($Q_{NEW}$) moves into the third region 704 or when the low watermark (L) moves into the second region 702), the example timer module 824 may enforce a waiting period of time before update is executed. At the expiration of the waiting period, if the update conditions still exist, the example stable quoting quantity module 800 performs the corresponding updates.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
receiving, by a computing device, a definition for a spread trading strategy including a quoting leg for a first tradable object and a lean leg for a second tradable object;
receiving, by the computing device, market data for the second tradable object, the market data being received from an electronic exchange and identifying an available quantity of the second tradable object at a price level determined according to as the trading strategy;
monitoring, by the computing device, the market data for the second tradable object identifying the available quantity of the second tradable object at the price level as the market data is received;
in response to monitoring the market data:
dynamically generating, by the computing device, a distribution for the available quantity of the second tradable object based on the market data, wherein the distribution is representative of the available quantity of the second tradable object at the price level determined according to the trading strategy over a previous period of time, where the distribution establishes a range having at least one threshold, and wherein the distribution for the available quantity and the at least one threshold are updated with changes to the available quantity of the second tradable object based on the market data;
dynamically calculating, by the computing device, a stable quoting quantity for the quoting led based on the monitored market data identifying the available quantity of the first tradable object, the distribution and the received definition for the trading strategy;
in response to receiving by the computing device a user command to trade the spread trading strategy, sending, by the computing device, a trading strategy order for the calculated stable quoting quantity of the first tradable object; and
dynamically updating, by the computing device, the trading strategy order according to changing the calculated stable quoting quantity to a new calculated stable quoting quantity of the trading strategy order in response to the calculated stable quoting quantity being beyond the at least one threshold.

2. The method of claim 1, wherein the distribution is generated based on a change in the available quantity of the first tradable object between at least a first time and a second time.

3. The method of claim 1, wherein the range established by the distribution includes a first threshold and a second threshold.

4. The method of claim 3, wherein the first and second thresholds are calculated to be at least one standard deviation away from the mean of the distribution.

5. The method of claim 3, wherein the first threshold is defined based on a first multiplier, and wherein the second threshold is defined based on a second multiplier.

6. The method of claim 1, wherein the distribution is generated based on a stability multiplier.

* * * * *